(No Model.)
E. HAAS.
LINING FOR METAL CANS OR JARS.
No. 417,242. Patented Dec. 17, 1889.
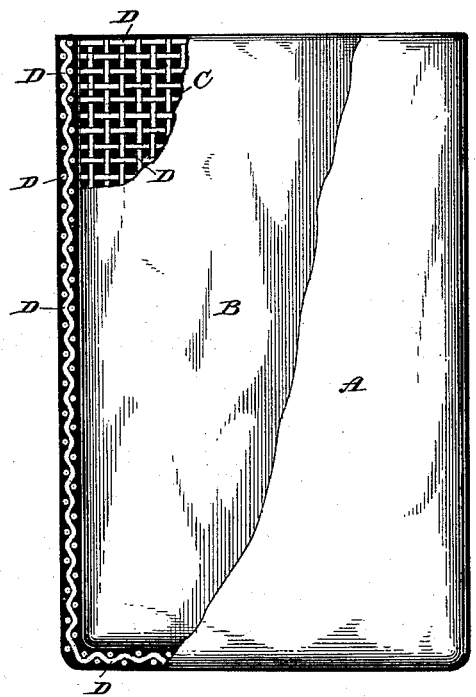
Witnesses
L. C. Hills
N. S. MacKaye
Inventor
Edwin Haas.
E. R. Stocking
Attorney

UNITED STATES PATENT OFFICE.

EDWIN HAAS, OF PHILADELPHIA, PENNSYLVANIA.

LINING FOR METAL CANS OR JARS.

SPECIFICATION forming part of Letters Patent No. 417,242, dated December 17, 1889.

Application filed August 18, 1888. Serial No. 283,074. (No model.)

*To all whom it may concern:*

Be it known that I, EDWIN HAAS, a citizen of the United States of America, residing at Philadelphia, in the county of Philadelphia and State of Pennsylvania, have invented certain new and useful Improvements in Linings for Metal Cans or Jars; and I do hereby declare the following to be a full, clear, and exact description of the invention, such as will enable others skilled in the art to which it appertains to make and use the same.

This invention has relation to metal and other jars or compartments, and more particularly to that class used for storage of acidulous sirups for use in soda-water fountains, and among the objects in view are to provide a jar having a lining of rubber, vulcanized in place on the netting foundation, so arranged within the same as to prevent the sirup from coming in contact with the metal of the can or jar of which it is composed, and thus preserve the sirup and jar from destruction by reason of the acid coming in contact with the metal.

Other objects and advantages of the invention will hereinafter appear, and the novel features thereof will be particularly pointed out in the claim.

Referring to the drawing, which is an elevation, partly in section, of one of my jars, A represents one of my improved jars, one side of which is broken away, with a portion of the rubber removed at one corner, and with the wire-netting exposed to view.

I make my jars of wire-netting D, which I weave according to any desired pattern or design, and then coat this netting both inside and out with rubber, as shown, where the inside B of the jar has been partly stripped, at C. This rubber may be ordinary soft vulcanized rubber or vulcanite, according to the purpose to which the jar is to be applied, since the proportion of sulphur mixed with the rubber in the process of vulcanizing is immaterial to the spirit of my invention.

Where the contents are to be acid, as is the case in soda-water fountains, the vulcanite or hard rubber is preferable, and the rubber vulcanized in place—that is, surrounding the wire-netting, as shown. By this means I get a jar of great lightness, also combining the advantages of the durability of the vulcanite and the strength of the netting.

Having described my invention, what I claim is—

A can made of wire-netting embedded in hard rubber, coating it upon both the inside and outside and vulcanized thereto, substantially as described.

In testimony whereof I affix my signature in presence of two witnesses.

EDWIN HAAS.

Witnesses:
 FRANK H. MASSEY,
 FRANK R. JORDAN.